United States Patent
Jang

(10) Patent No.: US 8,427,691 B2
(45) Date of Patent: Apr. 23, 2013

(54) IMAGE FORMING APPARATUS WHICH CHANGES ADDRESSES THAT ARE USED WHEN DATA IS READ FROM AND WRITTEN TO MEMORIES OF ARTICLES OF CONSUMPTION AND METHOD OF CONTROLLING THE IMAGE FORMING APPARATUS

(75) Inventor: Tae Hong Jang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 893 days.

(21) Appl. No.: 12/190,189

(22) Filed: Aug. 12, 2008

(65) Prior Publication Data

US 2009/0125686 A1 May 14, 2009

(30) Foreign Application Priority Data

Nov. 12, 2007 (KR) ........................ 10-2007-0114895

(51) Int. Cl.
- *G06K 15/00* (2006.01)
- *H04N 1/00* (2006.01)
- *G06F 3/00* (2006.01)

(52) U.S. Cl.
USPC ... 358/1.16; 358/1.17; 358/1.18; 358/426.05; 710/1; 710/3; 710/4; 710/5

(58) Field of Classification Search ............ 358/1.16, 358/1.17, 1.18, 400, 412, 396, 523, 524, 358/426.05, 444; 711/154, E12.002, 292, 711/103, 1, 2, 100, 115, 152, 155, 163, 200, 711/203, 214, 217, 218; 386/231; 710/1, 710/3, 4, 5, 13, 21, 26, 36, 52, 62, 200, 313; 399/12, 25, 109, 13, 111

See application file for complete search history.

(56) References Cited

U.S. PATENT DOCUMENTS

| | | | |
|---|---|---|---|
| 4,382,279 A * | 5/1983 | Ugon | 712/37 |
| 5,001,665 A * | 3/1991 | Gergen et al. | 711/207 |
| 5,442,704 A * | 8/1995 | Holtey | 711/163 |
| 5,586,081 A * | 12/1996 | Mills et al. | 365/230.08 |
| 6,614,685 B2 * | 9/2003 | Wong | 365/185.11 |
| 7,356,265 B2 * | 4/2008 | Kawai et al. | 399/12 |

(Continued)

FOREIGN PATENT DOCUMENTS

| | | |
|---|---|---|
| JP | 11-045212 | 2/1999 |
| JP | 2001-341322 | 11/2001 |

(Continued)

OTHER PUBLICATIONS

Hyeon-Cheol Park, Apparatus for Managing Consumables Having Memory, Jan. 24, 2007, Machine Translation Korean Patent Application Publication, KR10-2007-0010921, all pages.*

*Primary Examiner* — Benny Q Tieu
*Assistant Examiner* — Ngon Nguyen
(74) *Attorney, Agent, or Firm* — Staas & Halsey LLP

(57) ABSTRACT

An image forming apparatus and method of controlling the same, the image forming apparatus including: an article of consumption including a memory; and a print controller to perform a memory access to read and/or to write data from/to the memory. Addresses for the memory of the article of consumption are changed using access counts updated each time a memory access is requested, so that the memory access can be performed according to the changed addresses.

24 Claims, 8 Drawing Sheets

U.S. PATENT DOCUMENTS

| | | | |
|---|---|---|---|
| 7,653,777 B2 * | 1/2010 | Tan et al. | 711/103 |
| 7,805,086 B2 * | 9/2010 | Kawai et al. | 399/12 |
| 2002/0027676 A1 * | 3/2002 | Okunishi et al. | 358/1.16 |
| 2002/0036802 A1 * | 3/2002 | Tojo et al. | 358/1.16 |
| 2008/0168109 A1 * | 7/2008 | Gaurav et al. | 707/203 |

FOREIGN PATENT DOCUMENTS

| | | |
|---|---|---|
| JP | 2007-007946 | 1/2007 |
| KR | 10-2000-035729 | 6/2000 |
| KR | 2007-10921 | 1/2007 |

* cited by examiner

FIG. 2

| ADDRESS | CAPACITY (BYTES) | STORED CONTENTS |
|---|---|---|
| address_01 | N1 | SERIAL NUMBER OF TONER CARTRIDGE |
| address_02 | N2 | ACCESS COUNT |
| address_03 | N3 | VENDOR ID |
| address_04 | N4 | MANUFACTURING DATE |
| address_05 | N1 | AMOUNT OF TONER CARTRIDGE |
| address_06 | N1 | PRINT PAGE COUNT |
| address_07 | N2 | DOT COUNT |

FIG. 3

| ADDRESS | CAPACITY (BYTES) | STORED CONTENTS |
|---|---|---|
| address_01 | N1 | SERIAL NUMBER OF TONER CARTRIDGE |
| address_02 | N2 | ACCESS COUNT |
| address_07 | N2 | VENDOR ID |
| address_04 | N4 | MANUFACTURING DATE |
| address_06 | N1 | AMOUNT OF TONER CARTRIDGE |
| address_03 | N3 | PRINT PAGE COUNT |
| address_05 | N1 | DOT COUNT |

FIG. 4

| ID OF ARTICLE OF CONSUMPTION | ACCESS COUNT | TYPE OF MEMORY-MAP CHANGING ALGORITHM |
|---|---|---|
| AA_toner | count_01 | mp_algorithm 01 |
| | count_02 | mp_algorithm 05 |
| | count_03 | mp_algorithm 02 |
| | count_04 | mp_algorithm 06 |
| | ⋮ | ⋮ |
| BA_toner | count_01 | mp_algorithm 03 |
| | count_02 | mp_algorithm 07 |
| | count_03 | mp_algorithm 02 |
| | count_04 | mp_algorithm 08 |
| | ⋮ | ⋮ |

| INITIAL ADDRESS | CHANGED ADDRESS | STORED CONTENTS |
|---|---|---|
| ⋮ | ⋮ | ⋮ |
| address_05 | address_04 | AMOUNT OF TONER CARTRIDGE |
| address_06 | address_03 | PRINT PAGE COUNT |
| address_07 | address_05 | DOT COUNT |
| ⋮ | ⋮ | ⋮ |

90

IMAGE FORMING APPARATUS WHICH CHANGES ADDRESSES THAT ARE USED WHEN DATA IS READ FROM AND WRITTEN TO MEMORIES OF ARTICLES OF CONSUMPTION AND METHOD OF CONTROLLING THE IMAGE FORMING APPARATUS

CROSS-REFERENCE TO RELATED APPLICATION

This application claims the benefit of Korean Patent Application No. 2007-114895, filed Nov. 12, 2007 in the Korean Intellectual Property Office, the disclosure of which is incorporated herein by reference.

BACKGROUND OF THE INVENTION

1. Field of the Invention

Aspects of the present invention relate to image processing systems, and, more particularly, to an image forming apparatus that changes addresses that are used when data is read from and written to memories of articles of consumption, and a method of controlling the image forming apparatus.

2. Description of the Related Art

Generally, an image forming apparatus with a print function (such as a printer, a copier, a facsimile machine, and a multi-function device) includes articles of consumption that each have predetermined life spans and must be replaced according to the time period of use. Examples of the articles of consumption include roll paper, ink, toner cartridge, etc.

When the articles of consumption are installed in the image forming apparatus and a print medium (such as paper, transparency, etc.) is prepared to be fed, the image forming apparatus can perform a print operation. However, the articles of consumption may be lost or stolen from the image forming apparatus. Furthermore, the articles of consumption can be illegally used only if data stored in the memories of the articles of consumption are changed or initialized. Accordingly, managing the articles of consumption is difficult in the conventional image forming apparatus. Also, in the conventional image forming apparatus, it is difficult to determine whether the articles of consumption are certificate products, resulting in users' complaints.

SUMMARY OF THE INVENTION

Aspects of the present invention provide an image forming apparatus that prevents illegal users from discovering locations of data stored in a memory of an article of consumption and thus prevents illegal use of the article of consumption, and a method of controlling the image forming apparatus.

According to an aspect of the present invention, there is provided an image forming apparatus including: an article of consumption including a memory; and a print controller to perform a memory access to read and/or to write data from/to the memory of the article of consumption, wherein addresses of the memory change according to a request for the memory access.

The addresses of the memory may be changed each time the memory access is requested.

The print controller may include a storage unit to store initial information of the article of consumption; and the initial information may include a serial number of the article of consumption and/or an initial access count of the article of consumption.

The print controller may further include: a main controller to update the initial access count when accessing the memory; and a memory-map read-out unit to determine the changed addresses according to a changed memory-map and to provide the changed addresses to the main controller, the changed memory-map being created using one of a plurality of memory changing algorithms according to the updated access count.

The article of consumption may further include: a memory controller to update the initial access count according to the memory access; and a memory-map changing unit to select one of a plurality of memory-map changing algorithms according to the updated access count and to create a changed memory-map, by which the addresses of the memory are changed, according to the selected memory-map changing algorithm.

The memory controller may transfer already stored data in the memory using the changed addresses in the changed memory-map to reconfigure the memory and may access the reconfigured memory using the changed address.

The article of consumption may further include a map-history read-out unit to determine initial addresses of the memory, which correspond to the changed addresses, using a list, in which the list is created by matching the initial addresses before being changed with the changed addresses using a changed memory-map created by the memory-map changing unit, and to provide the discovered initial addresses to the memory controller.

The memory controller may access the memory using the initial addresses discovered by the map-history read-out unit.

According to another aspect of the present invention, there is provided a method of controlling an image forming apparatus including an article of consumption including a memory, and a print controller to read out and/or to write data from/to the memory, the method including: installing the article of consumption into the image forming apparatus; transmitting identification (ID) information and an initial access count, stored in the memory of the article of consumption, to the print controller; transmitting to the article of consumption a request for a memory access to read out and/or to write the data from/to the memory and updating the initial access count; selecting one of a plurality of memory-map changing algorithms according to the updated access count and creating a changed memory-map, by which addresses in the memory are changed, using the selected memory-map changing algorithm; and reading and/or writing the data from/to the memory using the changed addresses of the changed memory-map.

The creating of the changed memory-map may include moving previously stored data in the memory according to the changed addresses of the changed memory-map and reconfiguring the memory.

The reading and/or the writing of the data from/to the memory may include: matching initial addresses for the memory with the changed addresses using the changed memory-map to create a list; discovering an initial address corresponding to a changed address in the list; and reading and/or writing the data from/to the memory according to the initial address.

According to another aspect of the present invention, there is provided a method of controlling an image forming apparatus including an article of consumption including a memory, and a print controller to read out and/or to write data from/to the memory, the method including: reading data from the memory at one address a plurality of times; comparing the data read the plurality of times therewith; and recognizing that addresses for the memory are changed each time a memory access is performed when the read data are different from each other, and recognizing that the addresses are not changed each time the memory access is performed when the read data are identical to each other.

According to yet another aspect of the present invention, there is provided an article of consumption for an image forming apparatus including a print controller to read and/or to write data from/to the article of consumption, the article of consumption including: a memory to store the data; and a memory controller to change addresses of the memory according to a request for the memory access.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a list explaining an initial memory-map according to an embodiment of the present invention;

FIG. 3 is a list explaining a changed memory-map according to an embodiment of the present invention;

FIG. 4 is a list explaining a list for reading out a changed memory-map according to an embodiment of the present invention;

FIG. 7 is a list explaining a list to read a history of a memory-map according to the change of the memory-map, according to another embodiment of the present invention.

DETAILED DESCRIPTION OF THE EMBODIMENTS

Figure 1:
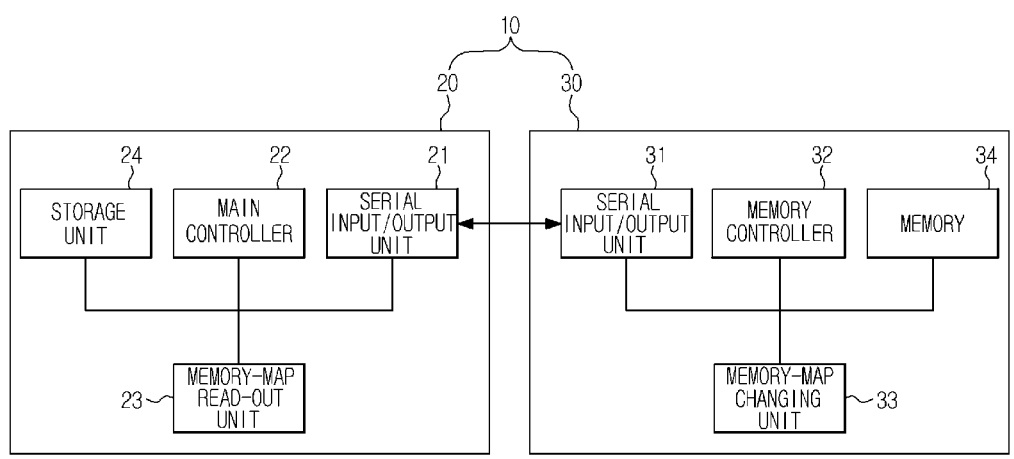
FIG. 1 is a schematic block diagram illustrating an image forming apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic block diagram illustrating an image forming apparatus 10 according to an embodiment of the present invention. Referring to FIG. 1, the image forming apparatus 10 includes a print controller 20 and an article of consumption 30 that is detachably installed to a body (not shown) of the image forming apparatus 10. Examples of the articles of consumption include roll paper, ink, toner cartridge, etc.

The print controller 20 includes a serial input/output unit 21, a main controller 22, a memory-map read-out unit 23, and a storage unit 24. The article of consumption 30 includes a serial input/output unit 31, a memory controller 32, a memory-map changing unit 33, and a memory 34. The memory 34 may be an electrically erasable programmable read only memory (EEPROM), though aspects of the present invention are not limited thereto. For example, the memory may be a volatile memory (such as RAM) or another type of non-volatile memory (such as ROM, flash memory, or a hard disk drive)

When the article of consumption 30 is installed to the image forming apparatus 10, the print controller 20 electrically connects to the article of consumption 30 so that a communication channel can be established therebetween. The print controller 20 and the article of consumption 30 may be connected through the respective serial input/output units 21 and 31 in order to perform a serial communication.

The memory 34 of the article of consumption 30 stores a variety of information to manage the article of consumption 30, such as initial information and management information. The initial information includes identification (ID) information (such as a serial number) and an access count of the article of consumption 30. The access count is a count value that increases each time there is an access request to read or to write data from/to the memory 34. The management information manages the article of consumption 30 installed in the image forming apparatus 10 and includes, for example, a manufacturing date, a vendor ID, a use capacity, and various count values recorded during the use of the article of consumption 30. Such various count values may include a print page count representing a total number of printed print media, and a dot count representing a number of dots, etc.

The memory controller 32 includes a memory-map for the memory 34. For example, as shown in FIG. 2, the initial memory-map 40 is configured to include an address field, a capacity field, and a stored contents field. In order to prevent an illegal or unauthorized use of the article of consumption 30 by an illegal user, the data is read out or written by a memory-map that is changed by the memory-map changing unit 33, as opposed to the initial memory-map 40.

The memory-map changing unit 33 uses a memory-map changing algorithm to change the configuration of the initial memory-map 40. For example, a memory-map 41, as shown in FIG. 3, is different from the initial memory-map 40 of FIG. 2, though the stored contents, address, and capacity are matched with each other. The memory-map changing unit 33 may choose one of a plurality of memory-map changing algorithms using an access count to change the memory-map. Furthermore, the memory-map changing unit 33 may choose the memory-map changing algorithm at random according to values of the access count. When an address is changed according to the used memory-map changing algorithm, the memory controller 32 transmits data to the memory 34 according to the changed address, so that the data of the memory 34 can be reconfigured.

When an article of consumption 30 is installed into the image forming apparatus 10, the initial information of the article of consumption 30 stored in the memory 34 (i.e., the ID information and initial access count of the article of consumption 30) is provided to the print controller 20 and stored in the storage unit 24. The initial access count is updated each time the main controller 22 of the print controller 20 reads out or writes data from/to the memory 34. The updated access count is provided to the memory-map read out unit 23.

The memory-map read out unit 23 reads out information that matches an access count corresponding to an article of consumption 30 with a type of memory-map changing algorithm. For example, the memory-map read out unit 23 reads out an access count, which was applied when the memory-map changing unit 33 changes the memory-map using a list 50 of FIG. 4, and a type of memory-map changing algorithm corresponding to the access count. Accordingly, the memory-map read out unit 23 determines the addresses from the initial address to a changed address using the read memory-map changing algorithm and provides the changed addresses to the main controller 22.

When the memory controller 32 receives an access request for the memory 34 from the main controller 22, the memory controller 32 updates an access count, receives an address changed according to the updated access count through the memory-map changing unit 33, and reads out or writes data from/to the memory 34.

As described above, when the article of consumption 30 is installed into the image forming apparatus 10, an initial access count is provided to the print controller 20 so that the print controller 20 and the article of consumption 30 can store the same initial access count. Therefore, each time the print controller 20 reads out or writes data from/to the memory 34 of the article of consumption 30, both the article of consumption 30 and the print controller 20 update the access count. Furthermore, one of the memory-map changing algorithms, which is selected according to the updated access count, is chosen, and an address changed by the algorithm is used. The address is changed each time a memory access is requested.

A signal measurement device (such as an oscilloscope) may be used to check whether the address is changed from the change of data that is read several times from the same address of the memory 34. That is, each time a read access is requested at the same address, an address to read out data from the memory 34 is changed. Therefore, when the contents of data that are read out a certain number of times from the memory 34 are different from each other, it can be determined that the change of address is normally performed.

As such, since the changed address is used each time an access to the memory 34 of the article of consumption 30 is requested, illegal users cannot transform or damage data of the memory 34, thereby preventing illegal use of the article of consumption 30.

Figure 5:
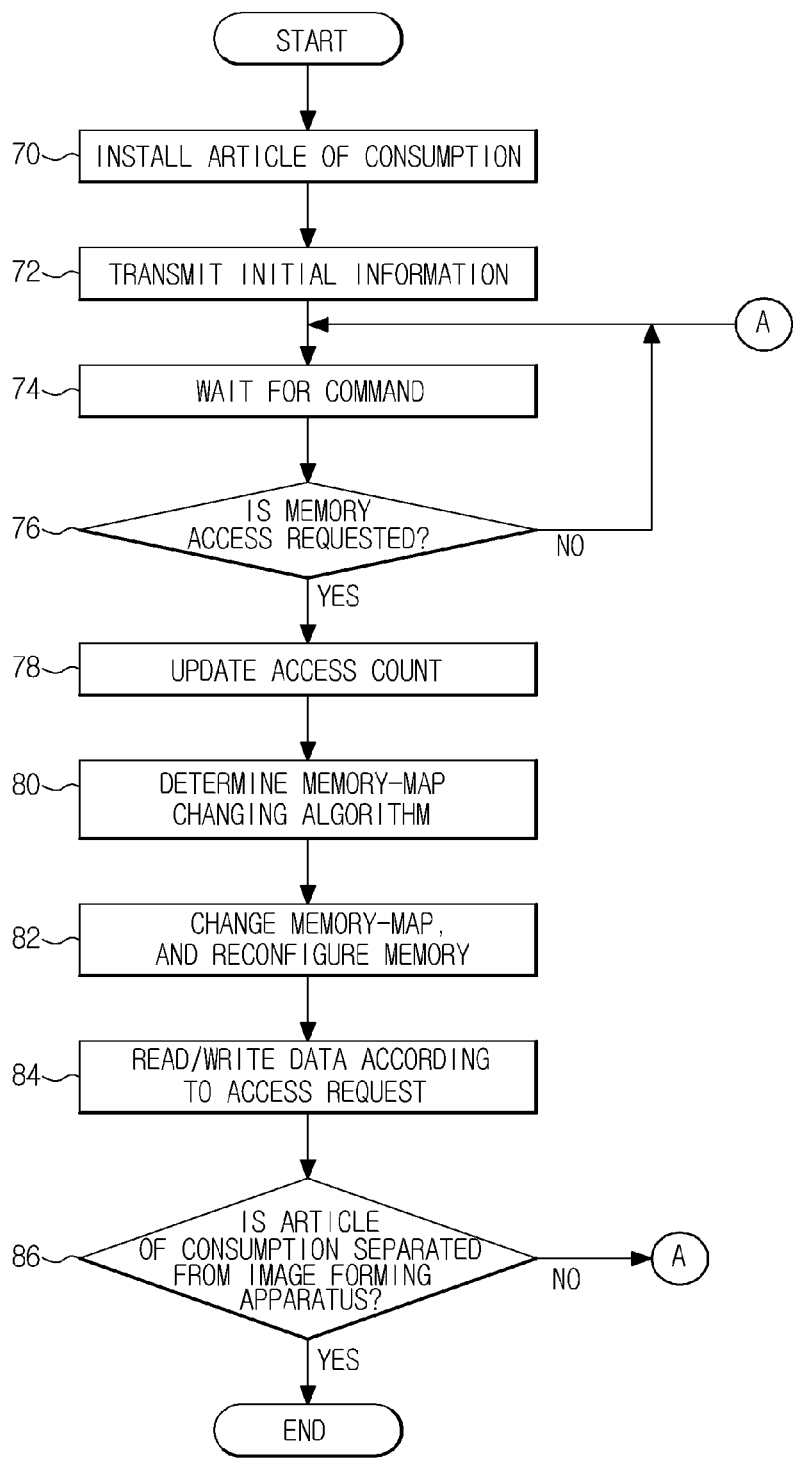
FIG. 5 is a flow chart describing a method of controlling an image forming apparatus according to an embodiment of the present invention.

FIG. 5 is a flow chart describing a method of controlling an image forming apparatus according to an embodiment of the present invention. Referring to FIG. 5, the article of consumption 30 is attached to the body of the image forming apparatus 10 in operation 70. Then, the initial information of the memory 34 (i.e., ID information and an initial access count of the article of consumption 30) is provided to the print controller 20 and stored in the storage unit 24 in operation 72. The memory controller 32 of the article of consumption 30 waits for a command from the print controller 20 in operation 74.

In order to access the memory 34, the print controller 20 updates the initial access count in the storage unit 24 and provides the updated access count to the memory-map read-out unit 23. The memory-map read-out unit 23 determines a memory-map of the article of consumption 30, which is changed for each memory access request, according to the updated access count, and then provides a changed address of the memory-map to the main controller 22. The main controller 22 outputs an access request command to the article of consumption 30 through the serial input/output unit 21.

The memory controller 32 determines whether a command input through the serial input/output unit 31 is a memory access request in operation 76. When it is determined that the input command is not an access request (operation 76), the procedure returns to operation 74. In contrast, when it is determined that the input command is an access request (operation 76), the memory controller 32 updates an access count in operation 78.

The updated access count is provided to the memory-map changing unit 33. The memory-map changing unit 33 uses a memory-map changing algorithm (for example, selects the algorithm from a plurality of memory-map changing algorithms) according to the updated access count in operation 80. The memory-map changing unit 33 creates a changed memory-map using the selected memory-map changing algorithm. For example, the memory-map changing unit 33 creates the changed memory-map 41 shown in FIG. 3 from the initial memory-map 40 shown in FIG. 2. The changed memory-map is provided to the memory controller 32. The memory controller 32 transfers data to the memory 34 based on changed addresses of the changed memory-map, so that the memory 34 is reconfigured with the transferred data in operation 82. The memory controller 32 performs a reading operation or writing operation according to the changed address requested by the main controller 22 in operation 84.

The memory controller 32 determines whether the article of consumption 30 is separated (i.e., removed) from the image forming apparatus 10 in operation 86. When the article of consumption 30 is not separated from the image forming apparatus 10, the procedure returns to operation 74 where the waiting operation is performed. In contrast, if it is determined that the article of consumption is separated from the image forming apparatus (operation 86), the controlling method is terminated.

In the embodiment described above, the memory-map is changed according to the access count and then the memory is reconfigured with data that is transferred according to the changed memory-map. However, the larger the storage capacity of the memory, the amount of work to reconfigure the memory may increase.

Taking this disadvantage into consideration, according to another embodiment of the present invention, a memory-map is changed according to an access count and a memory access operation is performed between the print controller 20 and the article of consumption 30 using changed addresses of the memory-map, but an operation to transfer data stored in the memory 34 is not performed according to the changed address. That is, the location of data stored in the memory 34 is fixed and, instead, a memory access request is performed using the changed address and history information of the initial address. This embodiment is described in detail as follows.

Figure 6:
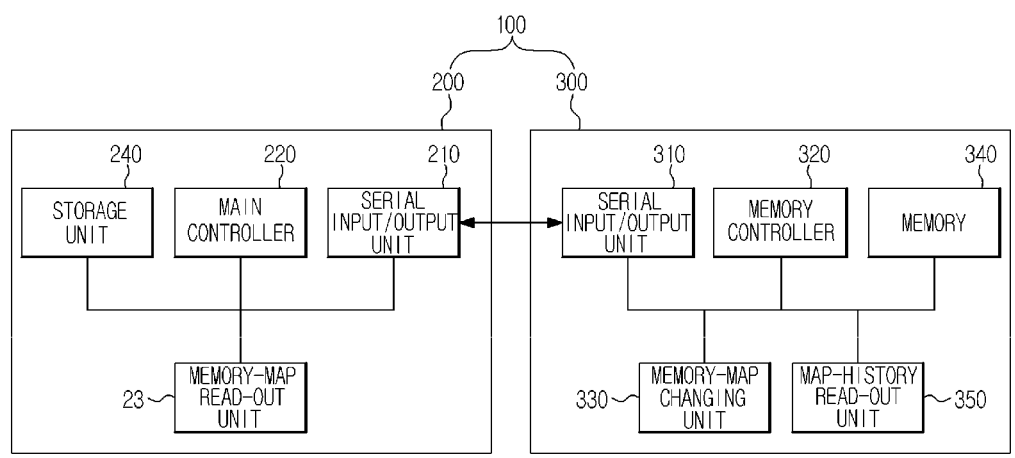
FIG. 6 is a schematic block diagram illustrating an image forming apparatus according to another embodiment of the present invention.

FIG. 6 is a schematic block diagram illustrating an image forming apparatus according to another embodiment of the present invention. Referring to FIG. 6, the image forming apparatus 100 includes a print controller 200 and an article of consumption 300.

The print controller 200 is configured to be the same as the print controller 20 as shown in FIG. 1. That is, the print controller 200 is configured to include a serial input/output unit 210, main controller 220, memory-map read-out unit 230, and storage unit 240.

The article of consumption 300 is configured to include a serial input/output unit 310, memory controller 320, memory-map changing unit 330, memory 340, and map-history read-out unit 350. The map-history read-out unit 350 provides an initial address to the memory controller 320 using information to match an address, which is changed each time the memory-map changing unit 33 changes a memory-map according to an access count, with the initial address. Here, an example of the information is a list 90 as shown in FIG. 7.

When the main controller 220 requests an access to perform a reading operation or writing operation from/to the memory 340 from the article of consumption 300, data is read out or written from/to the memory 340 according to the initial address corresponding to the requested changed address. The main controller 220 exchanges control commands with the memory controller 320 using addresses changed according to an access count that is updated each time a memory access occurs. The memory 340 does not transfer data according to the change of address. Therefore, although the article of consumption has a memory 340 with a relatively large capacity, the burden of work to move data is alleviated.

Figure 8:
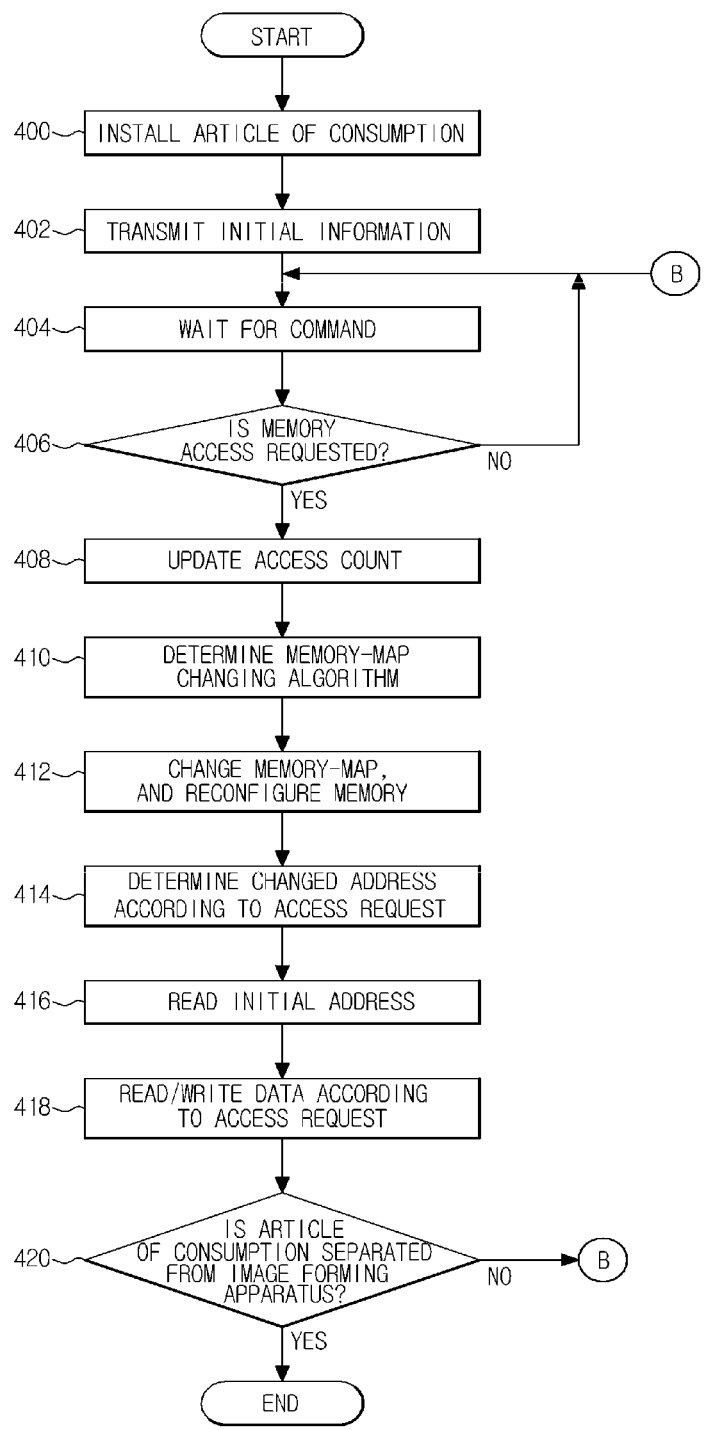
FIG. 8 is a flow chart describing a method of controlling an image forming apparatus according to another embodiment of the present invention.

FIG. 8 is a flow chart describing a method of controlling an image forming apparatus according to another embodiment of the present invention. Referring to FIG. 8, the article of consumption 300 is installed to the body of the image forming apparatus 100 in operation 400. Then, the initial information of the memory 340 (i.e., ID information and an initial access count of the article of consumption 300) is provided to the print controller 200 and stored in the storage unit 240 in operation 402. The memory controller 320 of the article of consumption 300 waits for a command from the print controller 200 in operation 404.

In order to access the memory 340, the print controller 200 updates the initial access count in the storage unit 240 and provides the updated access count to the memory-map read-out unit 230. The memory-map read-out unit 230 determines a memory-map of the article of consumption 300, which is changed for each memory access request, according to the updated access count, and then provides a changed address of the memory-map to the main controller 220. The main controller 220 outputs an access request command to the article of consumption 300 through the serial input/output unit 210.

The memory controller 320 determines whether a command input through the serial input/output unit 310 is a memory access request in operation 406. When it is determined that the input command is not an access request (operation 406), the procedure returns to operation 404. In contrast, when it is determined that the input command is an access request (operation 406), the memory controller 32 updates an access count in operation 408.

The updated access count is provided to the memory-map changing unit 330. The memory-map changing unit 330 uses a memory-map changing algorithm (for example, selects the algorithm from a plurality of memory-map changing algorithms) according to the updated access count in operation 410. The memory-map changing unit 330 creates a changed memory-map using the selected memory-map changing algorithm. For example, the memory-map changing unit 330 creates the changed memory-map 41 shown in FIG. 3 from the initial memory-map 40 shown in FIG. 2. The changed memory-map is provided to the map-history read-out unit 350 in operation 412.

The memory controller 320 provides the changed address when an access request is received to the map-history read-out unit 350, so that the map-history read-out unit 350 determines the changed address in operation 414.

The map-history read-out unit 350 determines the initial address corresponding to the determined changed address in operation 416. As an example, the map-history read-out unit creates a list 90 (such as shown in FIG. 7) using the changed memory-map. The determined initial address is provided to the memory controller 320.

The memory controller 320 performs a requested reading operation or a requested writing operation according to the initial address output from the map-history read-out unit 350 in operation 418.

The memory controller 320 determines whether the article of consumption 300 is separated (i.e., removed) from the image forming apparatus 100 in operation 420. When the article of consumption 300 is not separated from the image forming apparatus 100, the procedure returns to operation S404 where a waiting operation is performed. In contrast, when it is determined that the article of consumption 300 is separated from the image forming apparatus 100 (operation 420), the controlling method is terminated.

As is apparent from the above description, aspects of the present invention do not allow illegal users to know the location of data stored in a memory of an article of consumption since changed addresses are used each time there is an access request to read out or write data from/to the memory. Accordingly, the data stored in the memory of an article of consumption cannot be changed or corrupted by illegal users.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image forming apparatus comprising:
   an article of consumption comprising a memory;
   a print controller to perform a memory access to read and/or to write data from/to the memory of the article of consumption,
   wherein addresses in the memory changes according to a request for the memory access such that a data that is stored at an initial address is stored at a new address allowing a new data to be stored at the initial address; and
   the print controller comprises a signal measurement device to read data from a same address of the memory a plurality of times so as to detect whether the address is changed from the change in the read data from the same address in order to determine a normal operation of the article of consumption.

2. The apparatus as claimed in claim 1, wherein the addresses of the memory are changed each time the memory access is requested.

3. The apparatus as claimed in claim 1, wherein:
   the print controller comprises a storage unit to store initial information of the article of consumption; and
   the initial information comprises an initial access count of the article of consumption.

4. The apparatus as claimed in claim 3, wherein the print controller further comprises:
   a main controller to update the initial access count when accessing the memory; and
   a memory-map read-out unit to determine the changed addresses according to a changed memory-map and to provide the changed addresses to the main controller, the changed memory-map being created using one of a plurality of memory changing algorithms according to the updated access count.

5. The apparatus as claimed in claim 3, wherein the article of consumption further comprises:
   a memory controller to update the initial access count according to the memory access; and
   a memory-map changing unit to select one of a plurality of memory-map changing algorithms according to the updated access count and to create a changed memory-map, by which the addresses of the memory are changed, according to the selected memory-map changing algorithm.

6. The apparatus as claimed in claim 5, wherein the memory controller transfers already-stored data in the memory using the changed addresses in the changed memory-map to reconfigure the memory and accesses the reconfigured memory using the changed addresses.

7. The apparatus as claimed in claim 5, wherein:
   the article of consumption further comprises a map-history read-out unit to determine initial addresses of the memory, which correspond to the changed addresses, and to provide the discovered initial addresses to the memory controller; and
   the memory controller accesses the memory using the initial addresses discovered by the map-history read-out unit.

8. The apparatus as claimed in claim 7, wherein the map-history read-out unit determines the initial addresses using a list created by matching the initial addresses to the changed addresses according to the changed memory-map created by the memory-map changing unit.

9. The apparatus as claimed in claim 5, wherein the print controller further comprises:
   a main controller to update the initial access count when accessing the memory; and
   a memory-map read-out unit to determine the changed addresses according to a print controller changed memory-map and to provide the changed addresses to the main controller, the print controller changed memory-map being created using the one of the plurality of memory changing algorithms according to the updated access count.

10. The apparatus as claimed in claim 1, wherein the article of consumption is roll paper, an ink cartridge, or a toner cartridge.

11. A method of controlling an image forming apparatus including an article of consumption comprising a memory, and a print controller to read out or with data from/to the memory, the method comprising:
   transmitting an initial access count, stored in the memory of the article of consumption, to the print controller;
   transmitting, from the print controller to the article of consumption, a request for a memory access to read out and/or write the data from/to the memory and updating the initial access count;
   selecting one of a plurality of memory-reap changing algorithms according to the updated access count and creating a changed memory-map, by which addressee in the memory are changed, using the selected memory-map changing algorithm such that a data that is stored at an initial address is stored at a new address allowing a new data to be stored at the initial address;
   reading and/or writing the data from/to the memory using the changed addresses of the changed memory-map; and
   reading from a same address of the memory a plurality of times so as to detect whether the address is changed from the change) in the read data from the same address in order to determine a normal operation of the article of consumption.

12. The method as claimed in claim 11, wherein the transmitting of the initial access count comprises transmitting the initial access count when the article of consumption is installed into the image forming apparatus.

13. The method as claimed in claim 11, wherein the creating of the changed memory-map comprises moving previously stored data in the memory according to the changed addresses of the changed memory-map and reconfiguring the memory.

14. The method as claimed in claim 11, wherein the reading and/or the writing of the data from/to the memory comprises:
   matching initial addresses in the memory with the changed addresses using the changed memory-map to create a list;
   discovering an initial address corresponding to a changed address in the list; and
   reading and/or writing the data from/to the memory according to the initial address.

15. A non-transitory computer readable recording medium comprising the method of claim 11 encoded on the computer readable recording medium and implemented by a computer.

16. A method of controlling an image forming apparatus including an article of consumption comprising a memory, and a print controller to read out and/or write data from/to the memory, the method comprising:
   reading data from the memory at one address a plurality of times;
   comparing the data read the plurality of times therewith;
   recognizing that addresses for the memory are changed each time a memory access is performed when the read data are different from each other, and recognizing that the addresses are not changed each time the memory access is performed when the read data are identical to each other and
   reading from the same address of the memory a plurality of times so as to detect whether the address is changed from the change in the read data from the same address in order to determine a normal operation of the article of consumption;
   wherein each time a read access is requested at the same initial address such that data is stored the initial address is changed to a new address allowing new data to be stored at the initial address.

17. An article of consumption for an image forming apparatus comprising a print controller to read and/or to write data from to the article of consumption, the article of consumption comprising:
   a memory to store the data; and
   a memory controller to change addresses of the memory according to a request for the memory access;
   wherein each time a read access is requested at the same initial address such that data is stored the initial address is changed to a new address allowing new data to be stored at the initial address;
   the memory controller comprises a signal measurement device to read data from a same address of the memory a plurality of times so as to detect whether the address is changed from the change in the read data from the same address in order to determine a normal operation of the article of consumption.

18. The article of consumption as claimed in claim 17, wherein the addresses of the memory are changed each time the memory access is requested.

19. The article of consumption as claimed in claim 17, wherein:

the memory stores an initial access count of the article of consumption; and the memory controller updates the initial access count according to the memory access.

20. The article of consumption as claimed in claim 19, further comprising a memory-map changing unit to select one of a plurality of memory-map changing algorithms according to the updated access count and to create a changed memory-map, by which the addresses of the memory are changed, according to the selected memory-map changing algorithm.

21. The article of consumption as claimed in claim 20, wherein the memory controller transfers already-stored data in the memory using the changed addresses in the changed memory-map to reconfigure the memory and accesses the reconfigured memory using the changed addresses.

22. The article of consumption as claimed in claim 20, further comprising a map-history read-out unit to determine initial addresses of the memory, which correspond to the changed addresses, and to provide the discovered initial addresses to the memory controller, wherein the memory controller accesses the memory using the initial addresses discovered by the map-history read-out unit.

23. The article of consumption as claimed in claim 22, wherein the map-history read-out unit determines the initial addresses using a list created by matching the initial addresses to the changed addresses according to the changed memory-map created by the memory-map changing unit.

24. The article of consumption as claimed in claim 17, wherein the article of consumption is roll paper, an ink cartridge, or a toner cartridge.

\* \* \* \* \*

UNITED STATES PATENT AND TRADEMARK OFFICE
CERTIFICATE OF CORRECTION

PATENT NO. : 8,427,691 B2  
APPLICATION NO. : 12/190189  
DATED : April 23, 2013  
INVENTOR(S) : Tae Hong Jang It is certified that error appears in the above-identified patent and that said Letters Patent is hereby corrected as shown below:

In the Claims

Column 9, Line 51, In Claim 11, delete "or with" and insert -- or write --, therefor.

Column 9, Line 59, In Claim 11, delete "memory-reap" and insert -- memory-map --, therefor.

Column 9, Line 61, In Claim 11, delete "addressee" and insert -- addresses --, therefor.

Column 10, Line 3, In Claim 11, delete "change)" and insert -- change --, therefor.

Column 10, Line 41, In Claim 16, delete "other and" and insert -- other; and --, therefor.

Column 10, Line 53, In Claim 17, delete "from to" and insert -- from/to --, therefor.

Signed and Sealed this  
Thirteenth Day of August, 2013

Teresa Stanek Rea  
*Acting Director of the United States Patent and Trademark Office*